United States Patent [19]

Yeager

[11] 4,036,572

[45] July 19, 1977

[54] BELT TENSIONING DEVICE FOR A VULCANIZING PRESS

[75] Inventor: Oscar Lewis Yeager, Pittsburgh, Pa.

[73] Assignee: Wean United, Inc., Pittsburgh, Pa.

[21] Appl. No.: 699,116

[22] Filed: June 23, 1976

[51] Int. Cl.² .............................................. B29C 3/00
[52] U.S. Cl. .................................. 425/338; 100/196; 74/242.8; 425/445
[58] Field of Search ....................... 100/196; 198/813; 425/371, 338, 339, 445, 446; 74/242.8, 242.1 R, 242.1 FP

[56] References Cited

U.S. PATENT DOCUMENTS

| | | | |
|---|---|---|---|
| 2,656,565 | 10/1953 | Apel et al. | 74/242.1 R X |
| 3,165,938 | 1/1965 | Hayes | 74/242.1 R X |
| 3,621,524 | 11/1971 | Sherwood | 425/371 X |
| 3,647,342 | 3/1972 | Hunt | 425/330 |
| 3,851,685 | 12/1974 | Ahrweiler et al. | 425/371 X |
| 3,868,204 | 2/1975 | Bongers | 425/338 |

Primary Examiner—Robert L. Spicer, Jr.
Attorney, Agent, or Firm—Daniel Patch

[57] ABSTRACT

An apparatus located alongside a multiplaten vulcanizing press in combination with a clamping device for stretching or tensioning elastomeric belt prior to closing the press, and maintaining the belt in alignment with the press platens while the press is closing to assure a uniform tensioning of the belt.

8 Claims, 2 Drawing Figures

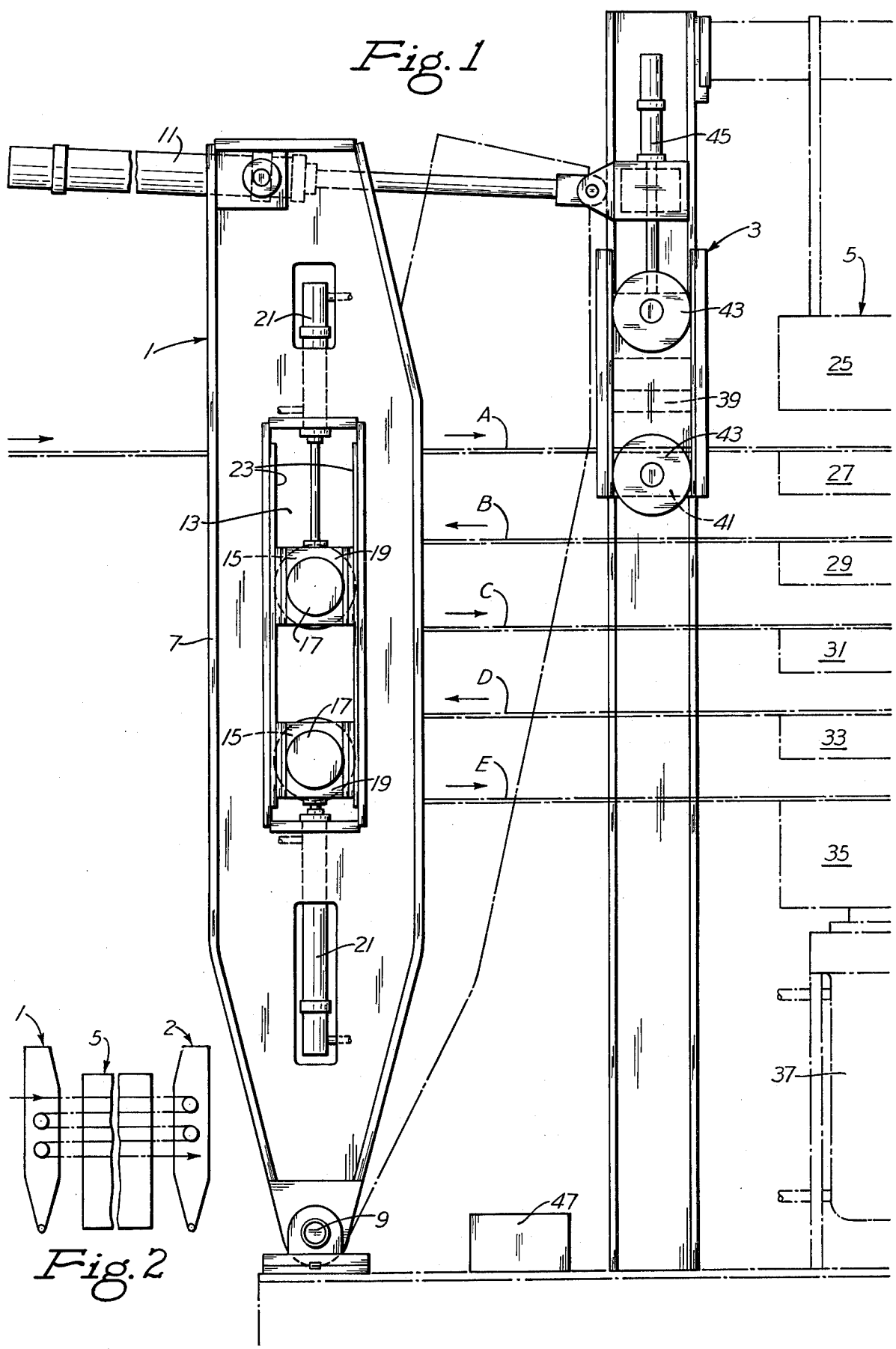

BELT TENSIONING DEVICE FOR A VULCANIZING PRESS

Presently, in the manufacture of composition belt, such as rubber, cloth, etc., a continuous strip of uncured belt is cured by pressing successive portions between adjacent platens of a vulcanizing press. Before the pressing operation, it is the usual practice to tension or stretch the belt to produce desirable properties in the finished product. Some of the present apparatuses, such as U.S. Pat. No. 3,619,332 and U.S. Pat. No. 3,647,342, tension a continuous belt by employing rollers for passing the belt around and moving the rollers horizontally away from the press. A drawback of the U.S. Pat. No. 3,647,342 is the cumbersome arrangement of a frame having power means for driving the transmission gears, which rotate screw jacks to reciprocate the yoke supporting the tension rollers, and the time delay involved in moving all these parts. A drawback of the U.S. Pat. No. 3,619,332 is that it is limited to two passes of belt through the press, and if more are desirable, separate means would have to be added to apply tension, which also would result in a time delay during horizontal movement of the rollers. Another disadvantage in both former arrangements is the lack of producing for a vertical movement of the belt as the platens come together in the closing of the press. This results in sections of the belt projecting out along the edges of the platens to be deflected during pressing, which creates non-uniform tension in the belt. U.S. Pat. No. 2,250,335 provides for vertical movement of the belt relative to the platens in the closing of the press, as well as horizontal movement, but because of its cumbersome and massive structure, a great amount of energy is expanded in moving it. Furthermore, its design is complicated and space consuming.

It is, therefore, an object of this invention to overcome the disadvantages of the prior apparatuses mentioned above by providing an apparatus which is simpler in construction, and which performs a simpler and quicker operation for applying uniform tension, and requires less floor space.

It is another object of the present invention to provide a support, a pivotal frame having an opening for receiving a strand of the belt when extending from between the press platens, in which said frame is connected to the support for both tensioning the strand in the press upon a pivotal movement away from the press, and for untensioning the strand in the press upon a pivotal movement towards the press; and means for pivotally moving the frame.

Another object of the present invention is to provide a pivotal frame having means for horizontally engaging and vertically moving the belt relative to the closing of the press to prevent deflection of the belt edges projecting between the closed platens, and assuring a uniform tensioning of the belt when the vertical centerline of the pivotal frame parallels the vertical centerline of the press, and means for vertically moving the engaging means.

A still further object of the present invention is to provide in the pivotal frame at least one roller having a shaft, a bearing chock assembly on the opposite ends of the shaft, received in the opening for allowing the roller to freely rotate and the belt to pass over the roller; a piston cylinder assembly located on each opposite end of the shaft, and connected to the bearing chock assembly for raising and lowering the roller; and guiding means including liners formed in the opening of the frame and arranged in the direction of the movement of the roller.

And yet, another object of the present invention is to provide frames on opposite sides of the press for tensioning a number of the strands of the belt; each frame having arranged at least two spaced-apart rollers in an opening thereof for horizontally engaging a number of strands of belts.

These and other advantages of the present invention will be better understood and appreciated when the following is read along with the accompanying drawing of which:

FIG. 1 is an elevational view of one of the stretcher assemblies, and

FIG. 2 is a diagrammatical view of the invention, employing two stretcher assemblies.

Viewing FIG. 1, one is able to better appreciate the arrangement of the stretcher assembly 1 relative to a clamping device 3 and a multiple decked vulcanizing press 5. The side of the press shown is referred to as the entry side. The operation and construction of clamping device 3 and press 5 well-known practice, more about which will be said later.

Stretcher or tensioning assembly 1 comprises a frame 7, pivotally mounted at the bottom by trunnion 9 at the base of the press. The hard lines, representing a vertical positioning, is the tensioning position for the belt. Pivotal movement is initiated by piston cylinder assembly 11 mounted at one end to the top of frame 7, and at the other end to the top of clamping device 3. The phantom piston is indicative of such movement of the frame towards the press by piston cylinder assembly 11, and is an untensioning or a pretensioning position for the belt. Located within the vertical centerline of the frame is a rectangular opening 13 for receiving two spaced-apart support rollers 15, each freely rotatably mounted by a shaft 17 received in a bearing chock assembly 19 on either end of shaft 17. Each roller is reciprocated vertically in a track guiding system, consisting of parallel liners 23, by a piston cylinder assembly 21 located on either end of the shaft 17, and connected to an adjacent surface of chock assembly 19. The vertical edges of each chock assembly 19 cooperate with liners 23 along the vertical edges of rectangular opeing 13 in frame 7. It should be noted that rollers 15 are moved vertically and parallel to the platen movements when the frame 7 is in its vertical or tensioning position in order to maintain alignment of the belt with the platens during the closing of the press, thereby assuring uniform tensioning of the belt. This vertical positioning may be accomplished by several well-known means, such as the stroke of the piston rod of the piston cylinder assembly 11.

As shown in FIG. 1, the press has six platens, which define five openings when the press is in its opened position. As is common in such presses, during its closing operation, top platen 25 remains stationary, while platens 27–35 are raised towards the top platen by several piston cylinder assemblies, one of which is indicated at 37. Similarly, clamping device 3 is shown in its opened position, and while closing the clamping device, top clamp 39 is stationary and bottom clamp 41, guided by rollers 43, is moved towards the top clamp by a piston cylinder assembly 45 in the framework of the clamping device. In order to synchronize the vertical movement of rollers 15 with the platens 27–35, an automatic control 47 controls necessary hydraulic discharge lines to accommodate the stretcher assembly 1 and press 5.

Referring to FIG. 2, there is illustrated the preferred embodiment of the present invention, whereby stretcher assembly 1 is located at the entry side and stretcher assembly 2 is located at the exit side of press 5. In this FIG. 2, clamping device 3 is not shown nor is a similar clamping device on the exit side shown, since it is not necessary in gaining a full understanding of the present invention, however, it is mentioned in the description of the invention. It should be noted that even though another stretcher assembly may not be used on the exit side, it is still mandatory to use a clamping device for applying tension to the belt. As can be seen, support rollers 15 of stretcher assembly 2 are staggerly spaced to accommodate strands A and B, the strands C and D of the belt, as opposed to the rollers 15 of stretcher assembly 1 shown in FIGS. 1 and 2, which accommodate strands B and C and strands D and E.

A brief description of the operation of the present invention will now be given. The arrows indicate the direction of and the serpentine manner in which the belt is threaded through the open press platens. At this point, the stretcher assembly on both sides of the press are pivoted towards the press, assuming a pretensioning position. At the entry side, a let-off device, not shown, presents a continuous supply of uncured belt which is passed between clamps 39 and 41, from where it is guided between stationary platen 25 and movable platen 27. On the exit side, the belt is passed around the top roller 15 of stretcher assembly 2, brought between adjacent movable platens 27 and 29, back to the entry side. Here, it is passed around top roller 15, taken back between adjacent platens 29 and 31 to the exit side, passed around lower roller 15 of stretcher assembly 2, and back to the entry side. It continues in this manner; that is, it is passed around lower roller 15 of stretcher assembly 1, and taken between platens 33 and 35, to the exit side where it is taken between the clamps of that clamping device to a wind-up reel (not shown). Rollers 15, during this phase of the operation, are in their lower position, as shown in FIG. 1. The clamps of both devices are actuated to come together to grip the belt at these points. Both stretcher assemblies are then pivoted away from each other and the press until they are in a vertical position parallel to the vertical centerline of the press to evenly apply tension to every strand running through the press. Piston cylinder assemblies 37 are activated to raise the platens 27-35 in unison towards stationary platen 25, and concurrently, piston cylinder assemblies 21, associated with the four rollers 15 in both stretcher assemblies are activated by the automatic control 47 to raise rollers 15 in unison with the platens. This raising prevents any deflections in the strands and assures uniform tensioning of the belt during the press operation.

Once vulcanizing occurs, the press is opened simultaneously as the rollers 15 are lowered, the stretcher assemblies are pivoted towards the press, assuming an untensioning position for the belt, the clamps are opened, and another portion of the belt is indexed through the press. Some sections of the cured belt are passed around rollers 15, and the cured section leaving the press is wound around the wind-up reel. Throughout the entire vulcanizing process of the continuous belt, the above operation of the stretcher assembly relative to the press and the clamping device continues in the above delineated manner.

It will be appreciated that in certain multiple decked press operations, for example, as illustrated in '332 patent, a single stretcher assembly having one roller 15 arranged at the side of the press opposite the clamping device will suffice. There are also applications where the roller or rollers of the pivotal stretcher assembly need not be vertically adjusted, and there are other applications where means other than rollers may be used.

In accordance with the patent statutes, I have explained the principles and operation of my invention, and have illustrated and described what I consider to represent the best embodiment thereof.

I claim:

1. An apparatus for tensioning a belt in a multiplaten vulcanizing press located at one side of and adjacent to said press comprising:
   a support,
   a pivotal frame connected to said suport and having an opening,
   means for pivotally moving said frame,
   means in said opening for horizontally engaging a strand of said belt when extending from between the press platens in a manner to tension the strand in said press upon a pivotal movement of said frame away from said press and to untension the strand in said press upon a pivotal movement of said frame toward said press, and
   means for moving said belt engaging means to maintain the strand in a horizontal alignment with a platen of said press to assure a uniform tension of the strand in said press.

2. An apparatus according to claim 1, wherein said frame is arranged in a generally vertical direction, and
   wherein said means for pivotally moving said frame consists of a piston cylinder assembly,
   means for connecting the bottom of said frame to said support, and
   means connecting the top of said frame to said piston cylinder assembly.

3. An apparatus according to claim 1, in which said press has at least one movable platen,
   wherein said means for pivotally moving said frame includes means for maintaining said frame in a plane parallel to a plane defining the direction of movement of said movable platen.

4. An apparatus according to claim 1, wherein said engaging means includes roller means, and
   wherein said moving means of said engaging means includes piston cylinder assembly means, and
   wherein said opening in said frame further comprises guiding means for guiding said belt engaging means during said movement in said opening of said frame.

5. An apparatus according to claim 4, wherein said roller means further includes:
   at least one roller having a shaft,
   a bearing chock assembly on the opposite ends of said shaft, received in said opening for allowing said roller to freely rotate and said belt to pass over said roller,
   said piston cylinder assembly means further includes,
   at least one piston cylinder assembly located on said opposite ends of said shaft of said roller and connected to said bearing chock assembly for raising and lowering said roller, and
   said guiding means includes liners formed in said opening and arranged in the direction of movement of said roller.

6. An apparatus according to claim 1, wherein a said frame is located on opposite sides of said press for tensioning a number of the strands of said belt.

7. An apparatus according to claim 6, in which each said frame includes means in said opening for horizontally engaging a number of strands of belt, said means comprising at least two spaced-apart rollers.

8. An apparatus for tensioning a belt in a multiplaten vulcanizing press located at one side of and adjacent to said press, comprising:

a support, a pivotal frame having an opening for receiving a strand of said belt when extending from between the press platens, in which said frame is connected to said support for both tensioning the strand in said press upon a pivotal movement away from said press and for untensioning a strand in said press upon a pivotal movement toward said press, and means for pivotally moving said frame, including means for maintaining said frame in a plane parallel to a plane defining the direction of movement of said movable platen at the terminus of said movement away from said press.

* * * * *